United States Patent
Kwak et al.

(10) Patent No.: US 7,965,285 B2
(45) Date of Patent: Jun. 21, 2011

(54) DISPLAY SUBSTRATE AND DISPLAY DEVICE HAVING THE SAME

(75) Inventors: Yun-Hee Kwak, Seoul (KR); Seung-Hwan Moon, Yongin-si (KR); Jong-Woong Chang, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 1086 days.

(21) Appl. No.: 11/734,150

(22) Filed: Apr. 11, 2007

(65) Prior Publication Data

US 2007/0296659 A1    Dec. 27, 2007

(30) Foreign Application Priority Data

Jun. 27, 2006    (KR) .................... 10-2006-0057796

(51) Int. Cl.
G09G 3/36 (2006.01)
(52) U.S. Cl. .......... 345/206; 345/87; 349/149; 349/150; 349/151; 349/152; 349/156
(58) Field of Classification Search ............ 345/87–103, 345/206; 349/149–152, 156
See application file for complete search history.

(56) References Cited

U.S. PATENT DOCUMENTS

| 6,104,465 A * | 8/2000 | Na et al. ........................ 349/152 |
| 2004/0135956 A1 * | 7/2004 | Kim et al. ...................... 349/148 |
| 2007/0159081 A1 * | 7/2007 | Bae ............................... 313/505 |

* cited by examiner

*Primary Examiner* — Richard Hjerpe
*Assistant Examiner* — Jennifer Zubajlo
(74) *Attorney, Agent, or Firm* — Innovation Counsel LLP

(57) ABSTRACT

A display substrate includes source lines, gate lines, an output pad part, a fan-out part and a first voltage line part. The source lines are in a display area. The gate lines cross the source lines. The output pad part is in a peripheral area surrounding the display area and is electrically connected to output terminals of a driving chip. The fan-out part is electrically connected between the output pad part and the source lines. The first voltage line part is inclined with respect to a central line of a chip area in which the driving chip is mounted toward opposite sides of the chip area to cross the fan-out part. Therefore, the line reactance of the fan-out part is decreased and the uniformity of the line resistance of the fan-out part is increased to improve image display quality.

17 Claims, 4 Drawing Sheets

DISPLAY SUBSTRATE AND DISPLAY DEVICE HAVING THE SAME

CROSS-REFERENCE TO RELATED APPLICATIONS

The present application claims priority from Korean Patent Application No. 2006-57796, filed on Jun. 27, 2006, the disclosure of which is hereby incorporated herein by reference.

FIELD OF THE INVENTION

The present invention relates to a display device having and, more particularly, to a display device having a substrate with more uniform line resistance.

DESCRIPTION OF THE RELATED ART

A liquid crystal display (LCD) device, in general, includes a display panel, a gate driving circuit and a source driving circuit. The display panel displays an image by varying the light transmittance of the liquid crystal molecules. The gate driving circuit is electrically connected to the display panel to generate a gate signal. The data driving circuit is electrically connected to the display panel to generate a data signal. The display panel includes a plurality of pixel parts. Each of the pixel parts includes a switching element and a liquid crystal capacitor electrically connected to the switching element. The gate driving circuit outputs the gate signal to turn on the switching element. The source driving circuit outputs the data signal to drive the liquid crystal capacitor.

To decrease the weight, thickness, length and size of the LCD device a display panel may use a chip on glass (COG) structure in which the source driving circuit is directly mounted on the display panel. In the COG structure, metal lines transmitting input and output signals of the source driving chip are directly formed as various layers on the display panel. However, this structure increases the line resistance of the metal lines causing an RC delay of the signal, thereby adversely affecting image display quality.

SUMMARY OF THE INVENTION

The present invention provides a display device having a substrate exhibiting more uniform line resistance and decreased line reactance.

A display substrate in accordance with one embodiment of the present invention includes a plurality of source lines, a plurality of gate lines, an output pad part, a fan-out part and a first voltage line part. The source lines are located in a display region of the substrate. The gate lines cross the source lines. The output pad part is in a peripheral region surrounding the display region, and is electrically connected to output terminals of a driving chip. The fan-out part is electrically connected between the output pad part and the source lines. The first voltage line part is inclined outwardly with respect to the central line of the area in which the driving chip is mounted toward opposite sides of the chip area to cross the fan-out part.

A display substrate in accordance with another embodiment of the present invention includes a plurality of source lines, a plurality of gate lines, a driving chip, a first voltage line and a fan-out part. The source lines are disposed in a display area. The gate lines are disposed in the display area, and insulatingly crossing the source lines. The driving chip is disposed in a peripheral area surrounding the display area. The fan-out part has a plurality of output lines electrically connected between the driving chip and the source lines and crossing the first voltage line at angles to minimize capacitive reactance of the output lines.

A display device in accordance with another embodiment of the present invention includes a gate driving part, a source driving chip, a fan-out, and a first voltage line. The gate driving part applies gate signals to a plurality of gate lines in the display region. The source driving chip is in a peripheral region surrounding the display region and applies data signals to a plurality of source lines crossing the gate lines. The fan-out is electrically connected between the source driving chip and the source lines in the display region. A first part of the voltage line is inclined with respect to a central line of the source driving chip toward opposite sides of the source driving chip to cross the fan-out.

According to the present invention, the first voltage line that is directly formed on the display panel is inclined with respect to a horizontal line of the display panel and is partially overlapped by the fan-out part thereby decreasing the line reactance of the fan-out part and increasing the uniformity of line resistance to improve image display quality.

BRIEF DESCRIPTION OF THE DRAWINGS

The above and other advantages of the present invention will become more apparent by describing in detail example embodiments thereof with reference to the accompanying drawings, in which.

DESCRIPTION OF THE EMBODIMENTS

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, the regions illustrated in the figures are schematic in nature and their shapes are not intended to illustrate the actual shape of a region of a device and are not intended to limit the scope of the invention.

Figure 1:
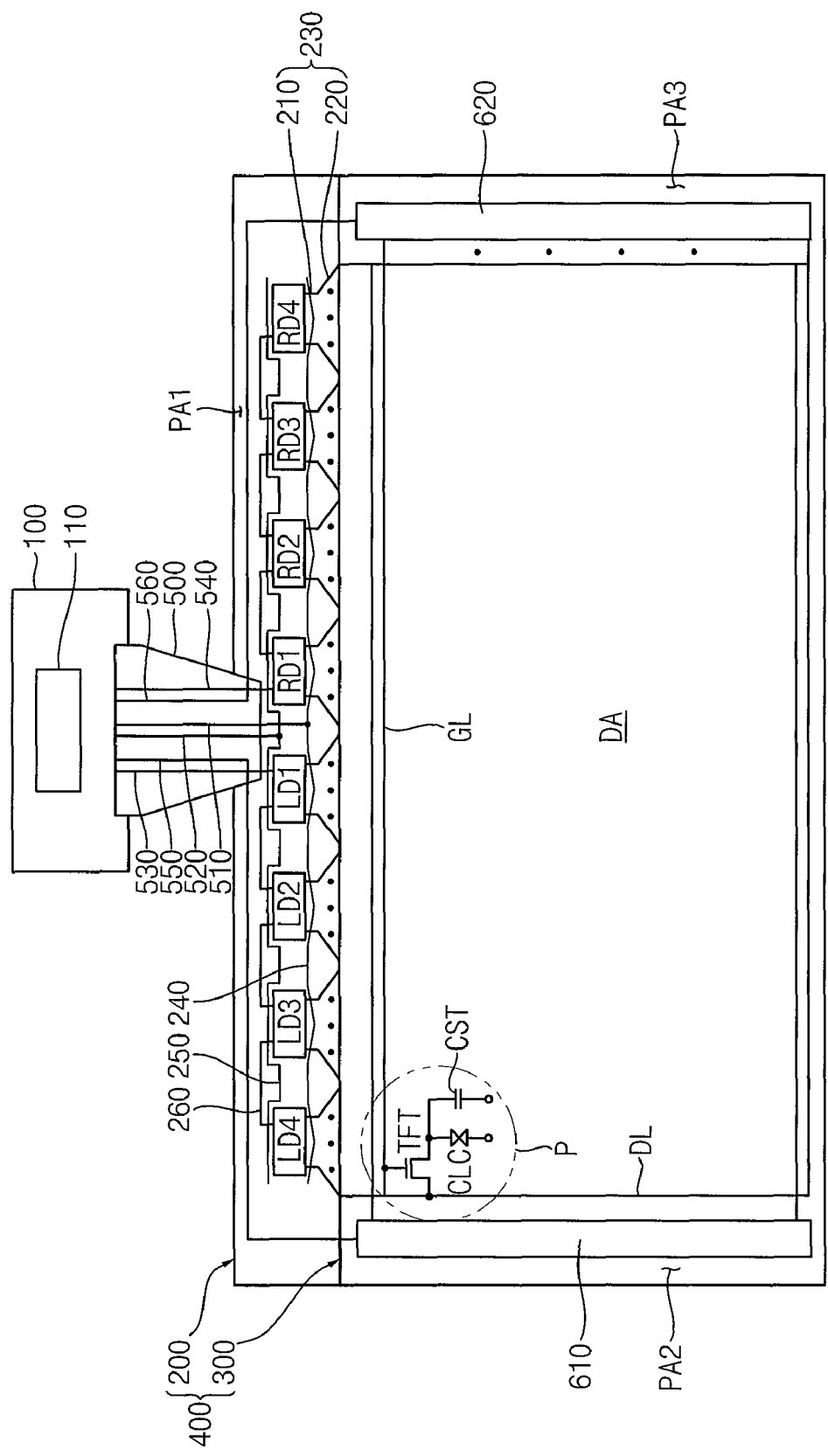
FIG. 1 is a plan view illustrating a display device in accordance with one embodiment of the present invention.

Referring to FIG. 1, the display device includes a printed circuit board 100, a display panel 400, and a flexible circuit board 500.

A main driving circuit 110 is mounted on the printed circuit board 100. The main driving circuit 110 generates control signals and driving signals based on primary control signals and primary driving signals to drive the display panel 300.

The display panel 400 includes a display substrate 200, an opposite substrate 300 and a liquid crystal layer (not shown). Substrate 300 is combined with the display substrate 200 so that the liquid crystal layer is interposed between the substrates. Display panel 400 is divided into a display region DA, a first peripheral region PA1, a second peripheral region PA2 and a third peripheral region PA3. The first, second and third peripheral regions PA1, PA2 and PA3 surround the display region DA.

A plurality of source lines DL (of which only one is shown for drawing clarity), and a plurality of gate lines GL (of which only one is shown for drawing clarity) are formed in the display region DA. The gate lines GL cross, but are insulated from, the source lines DL. A plurality of pixels P is defined at the intersections of the source and gate lines DL and GL. A switching element TFT, a liquid crystal capacitor CLC and a storage capacitor CST are formed at each of the pixels P.

A plurality of source driving chips is formed in the first peripheral region PA1. The source driving chips apply analog data signals to the source lines DL. For example, left source driving chips LD1, LD2, LD3, and LD4 are mounted on a left portion of the first peripheral region PA1, and right source driving chips RD1, RD2, RD3, and RD4 are mounted on a right portion of the first peripheral region PA1.

A fan-out part 230 is formed in the first peripheral region PA1. The source lines DL are electrically connected to the source driving chips LD1, . . . , LD4 and RD1, . . . , RD4 through the fan-out 230. The fan-out 230 includes a straight portion 210 and a diagonal portion 220. Alternatively, a plurality of fan-out parts 230 may be formed in the first peripheral region PA1.

A first voltage line 240, a second voltage line 250 and a connecting line 260 are formed in the first peripheral region PA1. The first voltage line 240, the second voltage line 250, and the connecting line 260 are electrically connected to the source driving chips LD1, RD1, . . . LD4 and RD4 to transmit the driving signals.

The first voltage line 240 is extended in a direction substantially in parallel with the gate lines GL, and is formed under the source driving chips LD1, RD1, . . . LD4 and RD4. A first driving voltage VDD1 and a first ground voltage VSS1 are applied to the source driving chips LD1, RD1, . . . LD4 and RD4 through the first voltage line 240.

In FIG. 1, the first voltage line 240 is partially overlapped by fan-out 230 to decrease the reactive voltage drop in the first voltage line 240.

A portion of the first voltage line 240 in a region corresponding to the source driving chips LD1, RD1, . . . LD4 and RD4 is bent to have a V-shape. Thus, the line reactance of fan-out 230 that is overlaps the first voltage line 240 is made more uniform.

The second voltage line 250 is extended in a direction substantially in parallel with the gate lines GL, and is formed on the source driving chips LD1, RD1, . . . LD4 and RD4. A second voltage VDD2 and a second ground voltage VSS2 are applied to the source driving chips LD1, RD1, . . . LD4 and RD4 through the second voltage line 250.

Data signals and gamma signals are applied to the source driving chips LD1, RD1, . . . LD4 and RD4 through the connecting line 260. Adjacent ones of the source driving chips LD1, RD1, . . . LD4 and RD4 are electrically connected to each other in cascade to transmit the data signals and the gamma signals through the connecting line 260.

A plurality of gate driving circuits 610 and 620 are integrated in the second and third peripheral regions PA2 and PA3. The gate driving circuits 610 and 620 apply the gate signals to the gate lines GL. Alternatively, a plurality of gate driving chips may be mounted in the second and third peripheral regions PA2 and PA3. For example, each of the gate driving circuits 610 and 620 may be electrically connected to the gate lines to apply the gate signals to the gate lines GL. Alternatively, one gate driving part may be formed in the second peripheral region PA2.

A plurality of signal lines 510, 520, 530, 540, 550 and 560 may be formed on the flexible circuit board 500 and the printed circuit board 100 which is electrically connected to display panel 400 through the flexible circuit board 500. The signal lines 510, 520, 530, 540, 550 and 560 transmit control signals and driving signals that are from the main driving circuit 110 to display panel 400.

For example, a first signal line 510 transmits a first driving voltage to the first voltage line 240. The second signal line 520 transmits a second driving voltage to the second voltage line 250. The first and second signal lines 510 and 520 are electrically connected to the first and second voltage lines 240 and 250, respectively. The first and second voltage lines 240 and 250 are between the first left source driving chip LD1 and the first right source driving chip RD1.

The third signal line 530 includes a plurality of signal lines that transmits the data signals and the gamma signals to the left source driving chips LD1, LD2, LD3 and LD4 in the left portion of the first peripheral region PA1. The third signal line 530 is electrically connected to the first left source driving chip LD1 that is in the left portion of the first peripheral region PA1. Thus, the data signals and the gamma signals are applied to the left source driving chips LD1, LD2, LD3 and LD4, in sequence.

The fourth signal line 540 includes a plurality of signal lines that transmits the data signals and the gamma signals to the right source driving chips RD1, RD2, RD3 and RD4 in the right portion of the first peripheral region PA1. The fourth signal line 540 is electrically connected to the first right source driving chip RD1 that is in the right portion of the first peripheral region PA1. Thus, the data signals and the gamma signals are applied to the right source driving chips RD1, RD2, RD3 and RD4, in sequence.

The fifth signal line 50 includes a plurality of signal lines that transmits the gate driving signals to the first gate driving part 610 in the second peripheral region PA2. The sixth signal line 560 includes a plurality of signal lines that transmits the gate driving signals to the second gate driving part 620 in the third peripheral region PA3.

Figure 2:
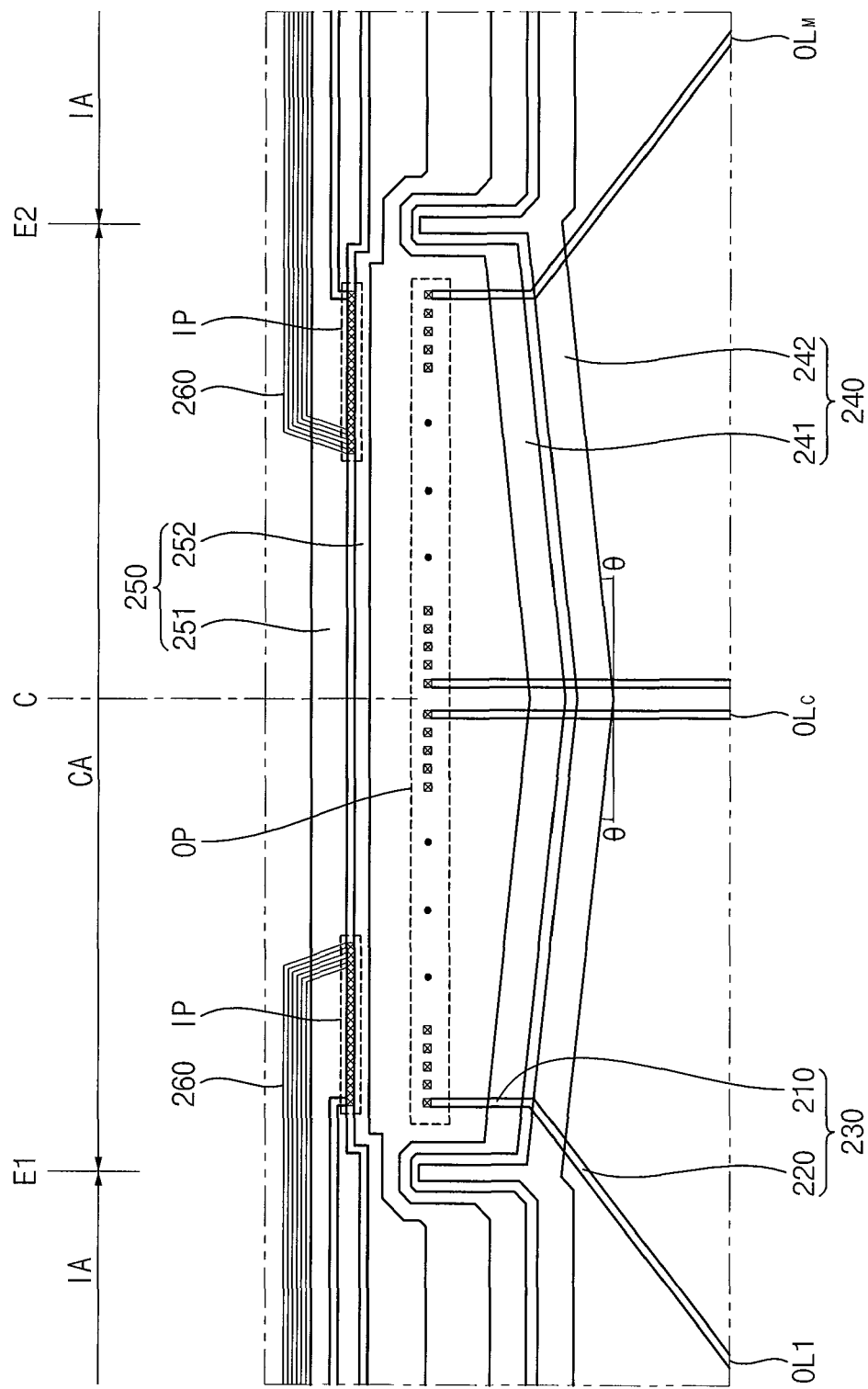
FIG. 2 is an enlarged plan view illustrating a display substrate shown in FIG. 1.

FIG. 2 is an enlarged plan view illustrating a display substrate shown in FIG. 1.

Referring to FIGS. 1 and 2, the first peripheral region PA1 includes a plurality of chip areas CA and a plurality of intermediate areas IA. A source driving chip is located in each of the chip areas CA. Each of the intermediate areas IA is located between adjacent chip areas CA. The first voltage line 240 and the second voltage line 250 are formed in the chip areas CA and the intermediate areas IA, and are formed from a first conductive layer. The connecting line 260 is formed in the intermediate areas IA, and is formed from a second conductive layer.

The first voltage line 240 includes a first power supply line 241 and a first grounding line 242. The first power supply line 241 and the first grounding line 242 are on an upper portion of the first peripheral region PA1, and are extended in a direction substantially in parallel with the gate lines GL.

The width of the first and second voltage lines 240 and 250 may be increased in the first peripheral region PA1 to decrease line resistance. In addition, the first and second voltage lines 240 and 250 that are formed from the first conductive layer may be overlapped by the second conductive layer to decrease voltage drop.

For example, the first voltage line 240 is partially overlapped by the fan out part 230 formed from the second conductive layer. The second voltage line 250 is partially overlapped by the connecting line 260 formed from the second conductive layer.

An input pad part IP and an output pad part OP are formed in each of the chip areas, and are formed from a third conductive layer. The input pad part IP is electrically connected to the input terminals of the source driving chip. The output pad part OP is electrically connected to the output terminals of the source driving chip.

The input pad part IP includes a plurality of input pads. The input pads of the input pad part IP are electrically connected to the signal lines of connecting line 260. The output pad part OP includes a plurality of output pads. The output pads of the output pad part OP are electrically connected to the output lines of fan-out 230.

Fan-out 230 includes a straight portion 210 and a diagonal portion 220. Fan-out 230 includes a plurality of output lines $OL_1, \ldots, OL_C, \ldots, OL_M$ corresponding to the output pads. Output lines $OL_1, \ldots, OL_C, \ldots, OL_M$ cross the first voltage line 240 to partially overlap the first voltage line 240.

The first line 240 in each of the chip areas CA is bent to be V-shaped, thereby controlling the line resistance of fan-out 230. For example, first voltage line 240 may be substantially symmetric with respect to a central line of the chip area CA and is inclined from the central line C to both sides E1 and E2 of the chip area CA by the inclination angle θ.

Hereinafter, the inclination angle θ of the first voltage line 240 is determined as follows. The space allotted to the first peripheral region PA1 in which the first voltage line 240 is formed is determined. The space of the first peripheral region PA1 may be changed to accommodate the particular kind of device. The minimum distance between the first power supply line 241 and the first grounding line 242 of the first voltage line 240 is determined with respect to the material used in forming the first conductive layer.

When the space of the first peripheral region PA1 and the minimum distance between the first power supply line 241 and the first grounding line 242 have been determined, the inclination angle θ is determined so that the difference between the line resistances of the central output line $OL_C$ and each of edge output lines $OL_1$ and $OL_M$ is minimized. The line resistance of each of the output lines $OL_1, \ldots, OL_C, \ldots, OL_M$ is smaller than that of output lines that would be extended in a horizontal direction having the inclination angle of zero. Thus, the inclination angle θ is determined, and the first voltage line 240 is inclined by the inclination angle θ.

The first voltage line 240 is bent to decrease the difference between the line resistances of the output lines $OL_1, \ldots, OL_C, \ldots, OL_M$. When the overlapped area between the output lines $OL_1, \ldots, OL_C, \ldots, OL_M$ and the first voltage line 240 is increased, the line reactance of the output lines $OL_1, \ldots, OL_C, \ldots, OL_M$ is increased.

The central output line $OL_C$ is formed from the straight portion 210 so that the overlapped area between the central output line $OL_C$ and the first voltage line 240 is small. However, each of the edge output lines $OL_1$ and $OL_M$ is formed from the straight portion 210 and the diagonal portion 220 so that the overlapped area between the edge output line and the first voltage line 240 is greater than the overlapped area between the central output line $OL_C$ and the first voltage line 240. Thus, each of the edge output lines $OL_1$ and $OL_M$ has greater line resistance than the central output line $OL_C$.

Therefore, the edges E1 and E2 of the first voltage line 240 are inclined with respect to the central line C of the first voltage line 240 so that the overlapped areas between the first voltage line 240 and the output lines $OL_1, \ldots, OL_C, \ldots, OL_M$ decreases sequentially. Thus, the capacitive reactance of the output lines $OL_1, \ldots, OL_C, \ldots, OL_M$ is decreased, thereby decreasing delay of the data signals that are output from the output lines $OL_1, \ldots, OL_C, \ldots, OL_M$, and preventing vertical defects in display panel 400.

Hereinafter, the same reference numerals will be used to refer to the same or like parts as those described in FIGS. 1 and 2, and any further explanation concerning the above elements will be omitted.

Figure 3:
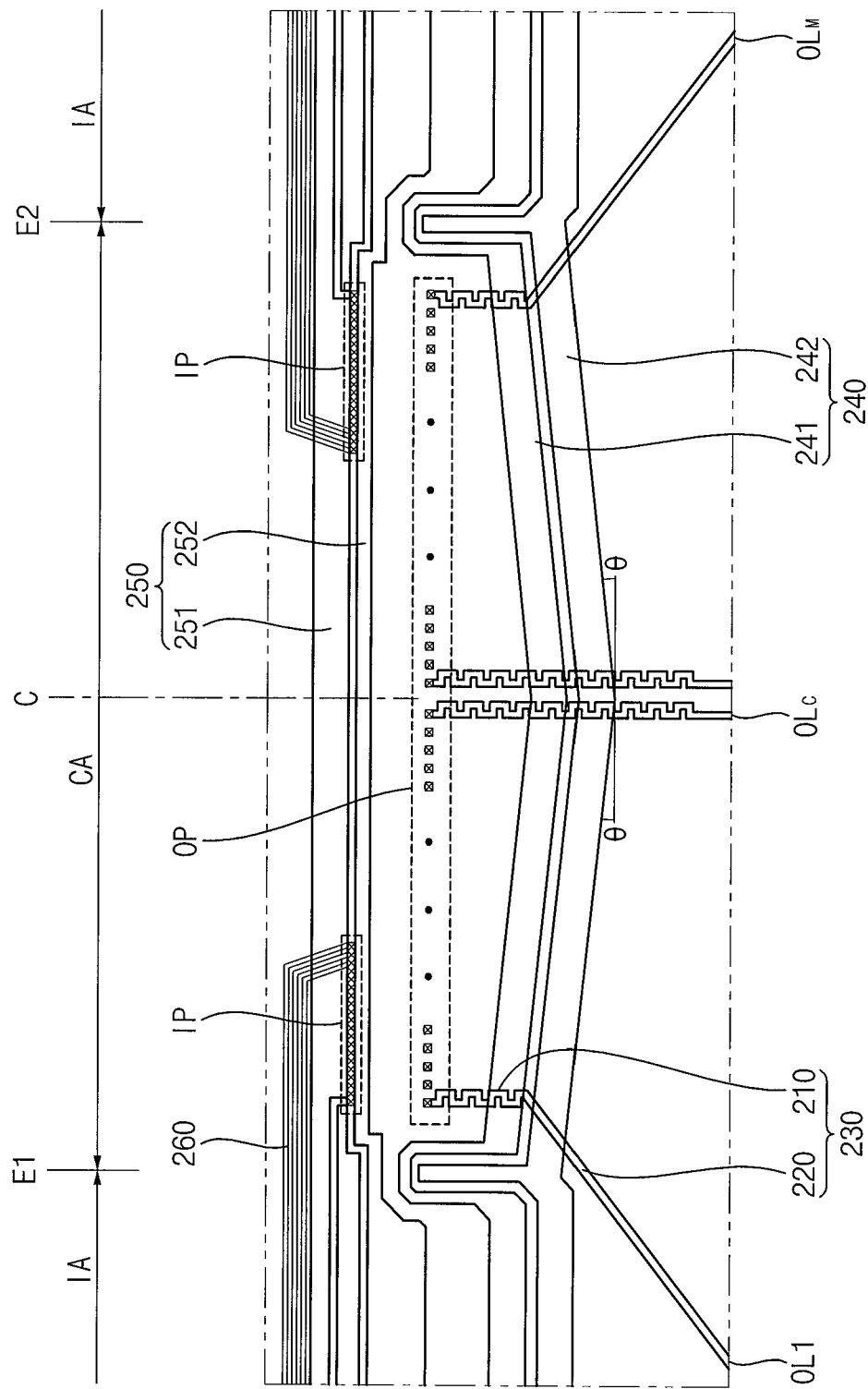
FIG. 3 is an enlarged plan view illustrating a display substrate in accordance with another embodiment of the present invention.

FIG. 3 is an enlarged plan view illustrating a display substrate in accordance with another embodiment of the present invention.

Referring to FIGS. 1 and 3, a first peripheral region PA1 includes a plurality of chip areas CA and a plurality of intermediate areas IA. A source driving chip is in each of the chip areas CA. Each of the intermediate areas IA is interposed between adjacent chip areas CA.

An output pad part OP is formed in the chip areas CA. Output pad part OP is electrically connected to a plurality of output terminals of the source driving chips. Output pad part OP includes a plurality of output pads, and is electrically connected to fan-out 230.

Fan-out 230 includes a straight portion 210 and a diagonal portion 220. Fan-out 230 includes a plurality of output lines $OL_1, \ldots, OL_C, \ldots, OL_M$ corresponding to the output pads. The output lines $OL_1, \ldots, OL_C, \ldots, OL_M$ overlap the first voltage line 240. The first part of voltage line 240 in each of the chip areas CA is bent to have a V-shape. The first voltage line 240 is inclined from a central line C to both sides E1 and E2 of the chip area CA by an inclination angle θ. When the first voltage line 240 has the V-shape, the overlapped area between the first voltage line 240 and the output lines $OL_1, \ldots, OL_C, \ldots, OL_M$ is decreased so that line resistance of the output lines $OL_1, \ldots, OL_C, \ldots, OL_M$ is decreased.

A zigzag pattern may be formed in the straight portion 210 of the output lines $OL_1, \ldots, OL_C, \ldots, OL_M$. For example, the central output line $OL_C$ of output lines $OL_1, \ldots, OL_C, \ldots, OL_M$ is formed from the straight portion 210. However, each of edge output lines $OL_1$ and $OL_M$ of the output lines $OL_1, \ldots, OL_C, \ldots, OL_M$ is formed from the straight portion 210 and a diagonal portion 220. When the straight portion 210 does not include the zigzag pattern, the length of the central output line $OL_C$ may be smaller than a length of each of the edge output lines $OL_1$ and $OL_M$. However, in FIG. 3, the straight portion 210 has the zigzag pattern to adjust the length of the central output line $OL_C$ so that the central output line $OL_C$ may have substantially the same length as each of the edge output lines $OL_1$ and $OL_M$.

The size and length of the zigzag pattern may be changed to control the length of the output lines $OL_1, \ldots, OL_C, \ldots, OL_M$. Thus, the central output line $OL_C$ may have substantially the same length as each of the edge output lines $OL_1$ and $OL_M$.

The zigzag pattern is formed on the straight portion 210 to increase a resistance uniformity of the output lines $OL_1, \ldots, OL_C, \ldots, OL_M$. In addition, the first voltage line 240 is bent to have a V-shape so that the overlapped area between the first voltage line 240 and the output lines $OL_1, \ldots, OL_C, \ldots, OL_M$ is decreased, thereby decreasing the capacitive reactance of the output lines $OL_1, \ldots, OL_C, \ldots, OL_M$. Thus, the uniformity of the line resistance of the output lines $OL_1, \ldots, OL_C, \ldots, OL_M$ is increased, and the capacitive reactance of the output lines $OL_1, \ldots, OL_C, \ldots, OL_M$ is decreased.

Therefore, defects caused by the reactance of the output lines $OL_1, \ldots, OL_C, \ldots, OL_M$ of the fan-out 230 is decreased, thereby improving image display quality.

Figure 4A:
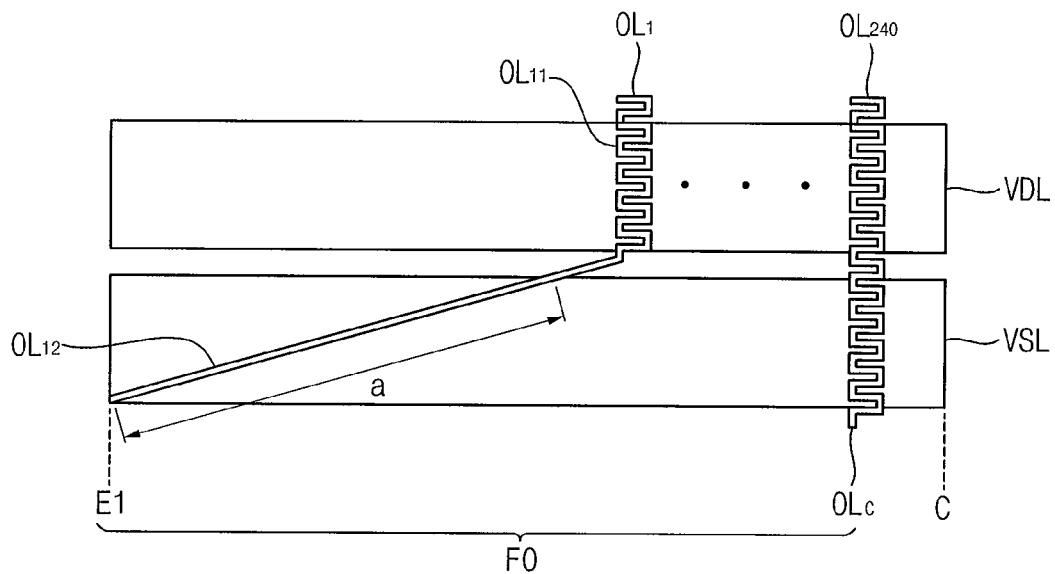
FIG. 4A is a plan view illustrating lines of a display substrate in accordance with another embodiment of the present invention.
Figure 4B:
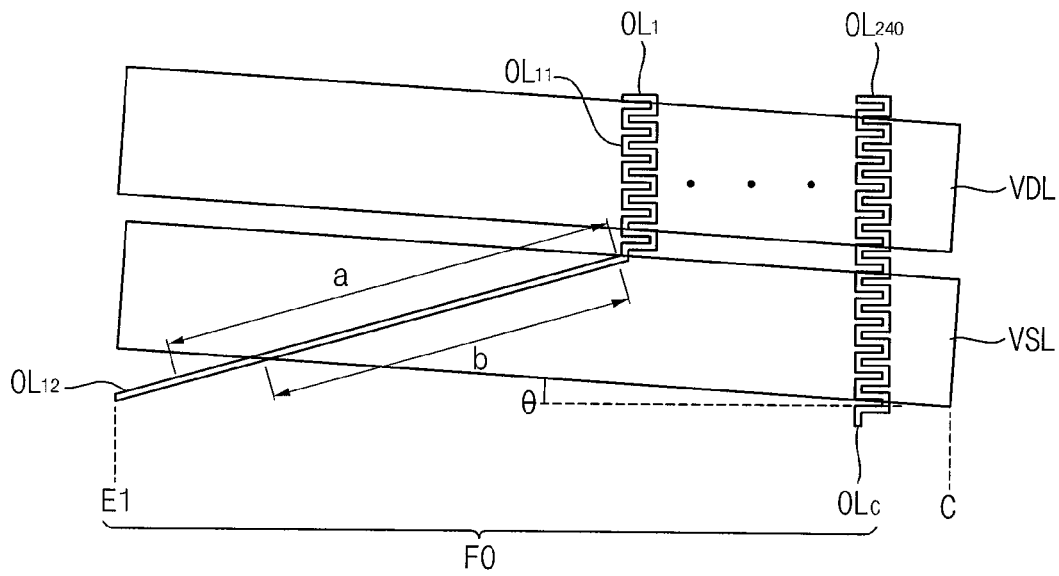
FIG. 4B is a plan view illustrating lines of a display substrate in accordance with another embodiment of the present invention.

FIG. 4A is a plan view illustrating lines of a display substrate in accordance with another embodiment of the present invention. FIG. 4B is a plan view illustrating lines of a display substrate in accordance with another embodiment of the present invention.

Referring to FIGS. 4A and 4B, a fan-out FO partially overlaps voltage line VDL and grounding line VSL. In FIGS. 4A and 4B, the first to the two hundred fortieth output lines $OL_1, \ldots OL_{240}$ that are on a left side of a central line of fan-out FO partially overlap voltage line VDL and the grounding line VSL.

The output lines $OL_1, \ldots, OL_{240}$ include a plurality of straight portions and a plurality of diagonal portions. The two hundred fortieth output line $OL_{240}$ includes a straight portion having a zigzag pattern. The two hundred fortieth output line $OL_{240}$ overlaps voltage line VDL and grounding line VSL. The first output line $OL_1$ includes a straight portion $OL_{11}$ and a diagonal portion $OL_{12}$, and the straight portion $OL_{11}$ has the zigzag pattern. The straight portion $OL_{11}$ of the first output line $OL_1$ overlaps voltage line VDL, and the diagonal portion $OL_{12}$ of the first output line $OL_{12}$ overlaps grounding line VSL.

In FIG. 4A, the voltage line VDL and the grounding line VSL are extended in a direction substantially in perpendicular to the straight portions of the output lines. The two hundred fortieth output line $OL_{240}$ overlaps a first area of voltage line VDL and grounding line VSL. The straight portion $OL_{11}$ and the diagonal portion $OL_{12}$ of the first output line $OL_1$ overlaps a second area of voltage line VDL and grounding line VSL.

In FIG. 4B, voltage line VDL and grounding line VSL are inclined with respect to a horizontal line of the display substrate by an inclination angle θ. The two hundred fortieth output line $OL_{240}$ is overlaps a third area of voltage line VDL and grounding line VSL. The straight portion $OL_{11}$ and the diagonal portion $OL_{12}$ of the first output line $OL_1$ overlap a fourth area of voltage line VDL and grounding line VSL.

In FIG. 4A, the first diagonal portion $OL_{12}$ of the first output line $OL_1$ overlaps a first length 'a' of grounding line VSL. In FIG. 4B, the first diagonal portion $OL_{12}$ of the first output line $OL_1$ overlaps a second length 'b' of grounding line VSL that is smaller than the first length 'a'. Thus, when the voltage line VDL and the grounding line VSL are inclined with respect to the horizontal line, the overlapped area between the output lines $OL_1, \ldots, OL_{240}$ and the voltage and grounding lines VDL and VSL is decreased so that line reactance of the output lines $OL_1, \ldots, OL_{240}$ is decreased.

Table 1 represents the relationship between the capacitance formed by the overlapped area between the output lines $OL_1, \ldots, OL_{240}$ and the voltage and grounding lines VDL and VSL shown in FIGS. 4A and 4B, and RC delay.

TABLE 1

|  | Display Substrate of FIG. 4A | | Display Substrate of FIG. 4B | |
| --- | --- | --- | --- | --- |
|  | Cap. | RC-delay | Cap. | RC-delay |
| 240th output | 3.63 | 0.101 | 1.28 | 0.091 |
| 1st output line($OL_1$) | 5.54 | 1.514 | 3.28 | 0.496 |

Referring to FIG. 4A and Table 1, the voltage line VDL and the grounding line VSL are extended in the direction substantially in perpendicular to the straight portions, and the ratio of capacitance corresponding to the first output line $OL_1$ to capacitance corresponding to the two hundred fortieth output line $OL_{240}$ is about 1:2. The ratio of RC delay corresponding to the first output line $OL_1$ to the RC delay corresponding to the two hundred fortieth output line $OL_{240}$ is about 1:15. The capacitance and the RC delay corresponding to the first output line $OL_1$ are formed by the overlapped area between the first output line $OL_1$ and the voltage and grounding lines VDL and VSL. The capacitance and the RC delay corresponding to the two hundred fortieth output line $OL_{240}$ are formed by the overlapped area between the two hundred fortieth output line $OL_{240}$ and the voltage and grounding lines VDL and VSL.

Referring to FIG. 4B and Table 1, the voltage line VDL and the grounding line VSL are inclined with respect to the horizontal line of the display substrate, and the ratio of a capacitance corresponding to the first output line $OL_1$ to the capacitance corresponding to the two hundred fortieth output line $OL_{240}$ is about 1:2. The ratio of an RC delay corresponding to the first output line $OL_1$ to the RC delay corresponding to the two hundred fortieth output line $OL_{240}$ is about 1:5.

The display substrate of FIG. 4B has substantially the same ratio of capacitances corresponding to the first and two hundred fortieth output lines $OL_1$ and $OL_{240}$ as the display substrate of FIG. 4A. However, the RC delay of the display substrate of FIG. 4B is smaller than the RC delay of the display substrate of FIG. 4A.

According to the present invention, the voltage line is overlapped by the fan-out and is inclined with respect to the horizontal line of the display substrate. Thus, the overlapped area between the voltage line and the fan-out is decreased so that the capacitive reactance of the fan-out part is decreased. In addition, the straight portion of the fan-out part has the zigzag pattern to increase the uniformity of the line resistance between the lines of the fan-out part.

Therefore, the reactance of the fan-out part is decreased, and the uniformity of the line resistance of the fan-out part is increased so that the RC delay of the data signals output from the fan-out part is decreased, thereby preventing the vertical defect on the display panel.

This invention has been described with reference to the example embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A display substrate having a display area and a peripheral area, comprising:
   a plurality of source lines disposed in the display area;
   a plurality of gate lines crossing the source lines in the display area;
   a driving chip disposed in a peripheral area surrounding the display area;
   an output pad disposed in the peripheral area to be electrically connected to the driving chip;
   a first voltage line in a direction between the driving chip and the display area; and
   a fan-out electrically connected between the output pad and the source lines and crossing the first voltage line,
   wherein the first voltage line is inclined such that a distance between the display area and a first portion of the first voltage line adjacent to an edge portion of the driving chip is longer than a distance between the display area and a second portion of the first voltage line adjacent to a central portion of the driving chip.

2. The display substrate of claim 1, wherein the first voltage line is V-shaped and is positioned substantially symmetrically about the central line of the area in which the driving chip is mounted.

3. The display substrate of claim 2, wherein the first voltage line comprises:
   a first power supply line transmitting a first driving voltage to the driving chip; and
   a first grounding line transmitting a first ground voltage to the driving chip.

4. The display substrate of claim 1, wherein the fan-out comprises:
   a straight portion extended substantially in parallel with the central line of the area in which the driving chip is mounted, the straight portion having a zigzag pattern; and
   a diagonal portion extended in a direction inclined with respect to the central line.

5. The display substrate of claim 1, further comprising:
   a plurality of input pads in the chip area, each input pad being electrically connected to input terminals of the driving chip; and
   a connecting line electrically connected between adjacent input pads.

6. The display substrate of claim 5, further comprising a second voltage line part overlapping the connecting line.

7. The display substrate of claim 6, wherein the second voltage line comprises:
   a second power supply line transmitting a second driving voltage to the driving chip; and
   a second grounding line transmitting a second ground voltage to the driving chip.

8. The display substrate of claim 7, wherein the first and second voltage lines and the gate lines are formed from a first conductive layer, and the fan-out, the connecting line and the source lines are formed from a second conductive layer.

9. A display device comprising:
   a gate driving part applying a plurality of gate signals to a plurality of gate lines in a display area, respectively;
   a source driving chip in a peripheral area surrounding the display area, the source driving chip applying a plurality of data signals to a plurality of source lines crossing the gate lines;
   a fan-out part electrically connected between the source driving chip and the source lines in the display area; and
   a first voltage line part inclined to cross the fan-out part,
   wherein a distance between the display area and a first portion of the first voltage line adjacent to an edge portion of the source driving chip is longer than a distance between the display area and a second portion of the first voltage line adjacent to a central portion of the source driving chip.

10. The display device of claim 9, wherein the first voltage line part has a V-shape that is substantially symmetric with respect to the central line of the source driving chip.

11. The display device of claim 9, wherein the fan-out part comprises:
   a straight portion extended in a direction substantially in parallel with the central line, the straight portion having a zigzag pattern; and
   a diagonal portion extended in a direction inclined with respect to the central line.

12. The display device of claim 9, further comprising:
   a plurality of input pad parts electrically connected to input terminals of the source driving chip;
   a connecting line part electrically connected between adjacent input pad parts to apply data signals to the source driving chip, in sequence; and
   a second voltage line part partially overlapped with the connecting line part.

13. The display device of claim 12, wherein the first voltage line part comprises a first power supply line applying a first driving voltage to the source driving chip and a first grounding line applying a first ground voltage to the source driving chip, and the second voltage line part comprises a second power supply line applying a second driving voltage to the source driving chip and a second grounding line applying a second ground voltage to the source driving chip.

14. The display device of claim 13, wherein the first and second voltage line parts and the gate lines are formed from a first conductive layer, and the fan-out part and the connecting line part and the source lines are formed from a second conductive layer.

15. A display substrate comprising:
   a plurality of source lines disposed in a display area;
   a plurality of gate lines disposed in the display area, the gate lines insulatingly crossing the source lines;
   a driving chip disposed in a peripheral area surrounding the display area;
   a first voltage line in a direction between the driving chip and the display area; and
   a fan-out part having a plurality of output lines electrically connected between the driving chip and the source lines and crossing the first voltage line at angles to minimize capacitive reactance of the output lines,
   wherein the first voltage line is inclined such that a distance between the display area and a first portion of the first voltage line adjacent to an edge portion of the driving chip is longer than a distance between the display area and a second portion of the first voltage line adjacent to a central portion of the driving chip.

16. The display substrate of claim 15, wherein the fan-out part comprises:
   a straight portion extended substantially in parallel with a central line of an area in which the driving chip is mounted, the straight portion having a zigzag pattern; and
   a diagonal portion extended in a direction inclined with respect to the central line.

17. The display substrate of claim 16, wherein the straight line portion includes portions to equalize resistance among the output lines of the fan-out part.

* * * * *